US010329404B2

(12) United States Patent
Suzuki et al.

(10) Patent No.: US 10,329,404 B2
(45) Date of Patent: Jun. 25, 2019

(54) PARTIALLY FLUORINATED ELASTOMERS AND METHODS OF MAKING AND USING THEREOF

(71) Applicant: 3M INNOVATIVE PROPERTIES COMPANY, St. Paul, MN (US)

(72) Inventors: Yuta Suzuki, Kanagawa (JP); Tatsuo Fukushi, Woodbury, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 387 days.

(21) Appl. No.: 14/781,939

(22) PCT Filed: Apr. 30, 2014

(86) PCT No.: PCT/US2014/036114
§ 371 (c)(1),
(2) Date: Oct. 2, 2015

(87) PCT Pub. No.: WO2014/179432
PCT Pub. Date: Nov. 6, 2014

(65) Prior Publication Data
US 2016/0039995 A1 Feb. 11, 2016

Related U.S. Application Data

(60) Provisional application No. 61/818,660, filed on May 2, 2013.

(51) Int. Cl.
*C08K 5/43* (2006.01)
*C08L 27/16* (2006.01)
*C08L 27/20* (2006.01)
*C08L 101/04* (2006.01)

(52) U.S. Cl.
CPC ............... *C08K 5/43* (2013.01); *C08L 27/16* (2013.01); *C08L 27/20* (2013.01); *C08L 101/04* (2013.01)

(58) Field of Classification Search
CPC ......... C08K 5/43; C08L 27/16; C08L 101/04; C08L 27/20
USPC ........................................................ 524/520
See application file for complete search history.

(56) References Cited

U.S. PATENT DOCUMENTS

| 5,175,233 | A | 12/1992 | Lubowitz |
| 5,225,504 | A | 7/1993 | Tatsu |
| 5,266,650 | A | 11/1993 | Guerra |
| 5,356,986 | A | 10/1994 | Stewart |
| 5,384,374 | A | 1/1995 | Guerra |
| 5,827,602 | A | 10/1998 | Koch |
| 6,281,296 | B1 | 8/2001 | MacLachlan |
| 6,372,829 | B1 | 4/2002 | Lamanna |
| 7,879,948 | B2 | 2/2011 | Ogata |
| 8,461,237 | B2 | 6/2013 | Miyazawa |

| 2004/0054041 | A1 | 3/2004 | Schmidt |
| 2011/0268950 | A1 | 11/2011 | Miyazawa et al. |
| 2012/0077935 | A1 | 3/2012 | Gurevich |
| 2012/0149800 | A1 | 6/2012 | Lewandowski et al. |
| 2014/0040784 | A1 | 2/2014 | Behforooz |
| 2015/0080506 | A1 | 3/2015 | Kurosaki |

FOREIGN PATENT DOCUMENTS

| CN | 102781921 | 11/2012 |
| CN | 102985482 | 3/2013 |
| EP | 2 842 997 | 3/2015 |
| EP | 2 865 710 | 4/2015 |
| JP | H01-135854 A | 5/1989 |
| JP | H08-157538 A | 6/1996 |
| JP | H10-138267 A | 5/1998 |
| JP | 2002-006667 | 1/2002 |
| JP | 2003-211472 A | 7/2003 |
| JP | 2004-517185 | 6/2004 |
| JP | 2007-281048 | 10/2007 |
| JP | 2009-157463 A | 7/2009 |
| JP | 2009-256418 A | 11/2009 |
| JP | 2009-269974 | 11/2009 |
| JP | 2010-059311 A | 3/2010 |
| JP | 2010-100680 | 5/2010 |
| JP | 2010-165868 | 7/2010 |
| JP | 2010-174202 A | 8/2010 |
| JP | 2011-064287 | 3/2011 |
| JP | 2012-031889 | 2/2012 |
| JP | 2012-512264 | 5/2012 |
| JP | 2013-015676 | 1/2013 |
| WO | WO 2010-014274 | 2/2010 |
| WO | WO 2010/101304 | 9/2010 |
| WO | WO 2011/025847 | 3/2011 |
| WO | WO 2012-006487 | 1/2012 |
| WO | WO 2012/006487 | 1/2012 |
| WO | WO 2013/005624 | 1/2013 |
| WO | WO 2013/161708 | 10/2013 |

OTHER PUBLICATIONS

Bonhote, "Hydrophobic, Highly Conductive Ambient-Temperature Molten Salts" Journal of Inorganic Chemistry, 1996, vol. 35, No. 5, pp. 1168-1178.
Fuller, "Ionic Liquid-Polymer Gel Electrolytes", Journal of Electrochemical Society, 1997, vol. 144, No. 4, pp. L67-L70.
Kim, "N-Butyl-N-Methylmorpholinium bis(trifluoromethanesulfonyl) imide-PVdF(HFP) gel electrolytes," Electrochimica Acta, 2005, pp. 5673-5678.
Schafer, "Elucidating interactions of ionic liquids with polymer films using confocal Raman spectroscopy" Chem. Comm., 2005, pp. 2594-2596.
Scott, "Application of Ionic Liquids as Plasticizers for Poly(methyl methacrylate)", Chem. Comm., 2002, pp. 1370-1371.

(Continued)

*Primary Examiner* — Angela C Scott
(74) *Attorney, Agent, or Firm* — Thomas M. Spielbauer

(57) ABSTRACT

Described herein is a composition comprising: (i) a partially fluorinated elastomer gum comprising a partially fluorinated polymer; and (ii) less than 10 wt % of an ionic liquid based on the total weight of the partially fluorinated polymer and the ionic liquid.

18 Claims, No Drawings

(56) References Cited

OTHER PUBLICATIONS

Sekhon, "Physicochemical properties of proton conducting membranes based on ionic liquid impregnated polymer for fuel cells," Journal of Materials Chemistry, 2006, vol. 16, pp. 2256-2265.
Watanabe, "Conductivity study on ionic liquid/polymer complexes", Solid State Ionics, 1996, vol. 86-88, pp. 353-356.
Winterton, "Solubilization of polymers by ionic liquids" Journal of Materials Chemistry, 2006, vol. 16, pp. 4281-4293.
International Search Report for PCT International Application No. PCT/US2014/036114 dated Aug. 26, 2014, 3 pages.
Lueckman, M., et al., "Effects of ionic liquids on fluorinated rubber", Kautsch Gummi Kunstst, No. 65, pp. 26-32, May 2012.

PARTIALLY FLUORINATED ELASTOMERS AND METHODS OF MAKING AND USING THEREOF

CROSS REFERENCE TO RELATED APPLICATIONS

This application is a national stage filing under 35 U.S.C. 371 of PCT/US2014/036114, filed Apr. 30, 2014, which claims priority to U.S. Provisional Application No. 61/818,660, filed May 2, 2013, the disclosure of which is incorporated by reference in its/their entirety herein.

TECHNICAL FIELD

A composition comprising a partially fluorinated elastomer gum and an ionic liquid is described along with methods of making and uses thereof.

BACKGROUND

Partially fluoroelastomers such as copolymers of vinylidene fluoride (VDF) and hexafluoropropylene (HFP), and terpolymers of tetrafluoroethylene (TFE), vinylidene fluoride (VDF) and hexafluoropropylene (HFP) have been used for a variety of applications. Cure systems such as a peroxide cure system, amine cure system, and polyol cure system can be used to cross-link the partially fluorinated elastomer gums.

Compression set resistance is the ability of the material to retain its original shape/size when deformed by a force and the force is removed. The crosslinking density is one factor influencing the compression set of partially fluorinated elastomers. Crosslinkers can be used (e.g., bisphenol AF or its complexes with benzyltriphenylphosphonium chloride), however, as the amount of crosslinker is increased, cure speed is decreased.

Mooney viscosity is another factor influencing the compression set of partially fluorinated elastomers. In polyol cure systems, typically, partially fluorinated elastomers having a higher Mooney viscosity, have a lower compression set. However, the higher the Mooney viscosity, the more difficult it can be to process the partially fluorinated elastomer gum.

SUMMARY

There is a desire for a composition comprising curable fluoroelastomers that has good processing properties (such as cure speed, Mooney viscosity, etc.) while balancing the fluoroelastomers final properties (such as compression set). In one embodiment, it is desirable to have a composition free of solvents, such as volatile solvents.

In one aspect, a composition is provided comprising: (i) a partially fluorinated elastomer gum comprising a partially fluorinated polymer; and (ii) less than 10 wt % of an ionic liquid based on the total weight of the partially fluorinated polymer and the ionic liquid.

In one embodiment, the amount of the ionic liquid is greater than 0.01 wt % and less than 1.0 wt % based on the total weight of the ionic liquid and the partially fluorinated polymer.

In another embodiment, the amount of the ionic liquid is greater than 1.0 wt % and less than 10.0 wt % based on the total weight of the ionic liquid and the partially fluorinated polymer.

In another aspect, an article is provided comprising a curable composition comprising: (i) a partially fluorinated elastomer gum comprising a partially fluorinated polymer; and (ii) less than 10 wt % of an ionic liquid based on the total weight of the partially fluorinated polymer and the ionic liquid.

In another aspect, a cured article is provided comprising (i) a partially fluorinated elastomer gum comprising a partially fluorinated polymer; (ii) less than 10 wt % of an ionic liquid based on the total weight of the partially fluorinated polymer and the ionic liquid; and (iii) a curative.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B); and "copolymer" means a polymer derived from two or more different monomeric units and includes terpolymers, quadpolymers, etc.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Ionic liquids, which are salts in a liquid state, have been finding increased applications due to their unique properties, which include high ionic conductivity, wide electrochemical stability, good thermal stability, wide temperature liquid ranges, and environmentally-friendly nature.

Ionic liquids have been added to gel polymer electrolytes or ionically conductive polymers such as PVDF/HFP copolymers or sulfonated tetrafluoroethylene based fluoropolymers available under the trade designation "NAFION" to improve the polymer's ionic conductivity for use as electrolytes in lithium batteries, super capacitors, fuel cells, etc. Generally because the more ionic liquid used, the higher the ionic conductivity of the resulting composition, the ionic liquids typically are added in a weight ratio of at least 0.4 to 1 versus the polymer. See, for example, Fuller, J. et al., *J. Electrochem. Soc.*, vol. 144, no. 4, 2007, p. L67-L-69.

JP Pat. Publ. No. 2007-281048 (Mutsuaki et al.) discloses a gel composition for heat dissipation comprising an ionic liquid and a gelling agent, wherein the gelling agent is more than 2 weight (wt) % and less than 50 wt %. If the gelling agent is less than 2% by weight, the gelling of the composition is said to be insufficient and if the gelling agent exceeds 50% by weight, the elasticity and flexibility of the gel composition is said to be lost and the composition will become hard.

In the present disclosure, it has been discovered that by adding low amounts (e.g., less than 10 wt %) of an ionic liquid to a partially fluorinated elastomer gum, a composition can be attained having among other things, improved cure speed, lower Mooney viscosity, and/or improved compression set.

In one embodiment of the present disclosure, it has been also discovered that an ionic liquid may be used to solubilize the a component in the cure system, e.g. bisphenol AF (crosslinker) and/or benzyltriphenylphosphonium chloride (crosslinking aid), which in one embodiment, may provide improved dispersion of the curative.

An ionic liquid is a unique salt, which is in a liquid state at about 100° C. or less, has negligible vapor pressure, and high thermal stability. The ionic liquid is composed of a cation and an anion and has a melting point of generally about 100° C. or less (i.e., being a liquid at about 100° C. or less), about 95° C. or less, or even about 80° C. or less. Certain ionic liquids exist in a molten state even at ambient temperature since their melting points are less than room temperature, and therefore they are sometimes referred to as ambient temperature molten salts. The cation and/or anion of the ionic liquid are relatively sterically-bulky, and typically one and/or both of these ions are an organic ion. The ionic liquid can be synthesized by known methods, for example, by a process such as anion exchange or metathesis process, or via an acid-base or neutralization process.

The cation of the ionic liquid of the present disclosure may be an ammonium ion, a phosphonium ion, a sulfonium ion or the like, including various delocalized heteroaromatic cations, but is not limited thereto. The ammonium ion includes an ammonium ion selected from the group consisting of alkylammonium, imidazolium, pyridinium, pyrrolidinium, pyrrolinium, pyrazinium, pyrimidinium, triazonium, triazinium, quinolinium, isoquinolinium, indolinium, quinoxalinium, piperidinium, oxazolinium, thiazolinium, morpholinium, piperazinium, and a combination thereof. Examples of the phosphonium ion include a phosphonium ion selected from the group consisting of tetraalkylphosphonium, arylphosphonium, alkylarylphosphonium and a combination thereof. Examples of the sulfonium ion include a sulfonium ion selected from the group consisting of alkylsulfonium, arylsulfonium, thiophenium, tetrahydrothiophenium, and a combination thereof. The alkyl group directly bonded to nitrogen atom, phosphorus atom, or sulfur atom may be a linear, branched or cyclic alkyl group having a carbon number of at least 1, 2, or even 4 and not more than 8, 10, 12, 15, or even 20. The alkyl group may optionally contain heteroatoms such as O and N and S in the chain or at the end of the chain (e.g., a terminal —OH group). The aryl group directly bonded to nitrogen atom, phosphorus atom or sulfur atom may be a monocyclic or condensed cyclic aryl group having a carbon number of at least 5, 6, or even 8 and not more than 12, 15, or even 20. An arbitrary site in the structure constituting such a cation may be further substituted by an alkyl group, an alkenyl group, an alkynyl group, a cycloalkyl group, an aryl group, an aralkyl group, an arylalkyl group, an alkoxy group, an aryloxy group, a hydroxyl group, a carbonyl group, a carboxyl group, an ester group, an acyl group, an amino group, a dialkylamino group, an amide group, an imino group, an imide group, a nitro group, a nitrile group, a sulfide group, a sulfoxide group, a sulfone group, a halogen atom or the like, and a heteroatom such as oxygen atom, nitrogen atom, sulfur atom and silicon atom may be contained in the main chain or ring of the structure constituting the cation.

Specific examples of the cation include N-ethyl-N'-methylimidazolium, N-methyl-N-propylpiperidinium, N,N,N-trimethyl-N-propylammonium, N-methyl-N,N,N-tripropylammonium, N,N,N-trimethyl-N-butylammoniuim, N,N,N-trimethyl-N-methoxyethylammonium, N-methyl-N,N,N-tris(methoxyethyl)ammonium, N,N-dimethyl-N-butyl-N-methoxyethylammonium, N,N-dimethyl-N,N-dibutylammonium, N-methyl-N,N-dibutyl-N-methoxyethylammonium, N-methyl-N,N,N-tributylammonium, N,N,N-trimethyl-N-hexylammonium, N,N-diethyl-N-methyl-N-(2-methoxyethyl)ammonium, 1-propyl-tetrahydrothiophenium, 1-butyl-tetrahydrothiophenium, 1-pentyl-tetrahydrothiophenium, 1-hexyl-tetrahydrothiophenium, glycidyltrimethylammonium, N-ethylacryloyl-N,N,N-trimethylammonium, N-ethyl-N-methylmorphonium, N,N,N-trioctylammonium, N-methyl-N,N,N-trioctylammonium, N,N-dimethyl-N-octyl-N-(2-hydroxyethyl)ammonium, and a combination thereof.

A cation not containing a functional group or moiety exhibiting reactivity (for example, an unsaturated bond having reaction activity) is advantageous in view of heat resistance, and examples of such a cation include N-methyl-N-propyl piperidinium and N,N,N-trimethyl-N-propylammonium. It is advantageous that the group constituting the cation is substituted with fluorine atoms, because good compatibility with a fluoropolymer is expected.

The anion of the ionic liquid of the present disclosure may be, for example, a sulfate (R—OSO$_3^-$), a sulfonate (R—SO$_3$), a carboxylate (R—CO$_2$), a phosphate ((RO)$_2$P(=O)O$^-$), a borate represented by the formula: BR$_4^-$, such as tetrafluoroborate (BF$_4^-$) and tetraalkylborate, a phosphate represented by the formula: PR$_6^-$, such as hexafluorophosphate (PF$_6^-$) and hexaalkylphosphate, an imide (R$_2$N$^-$), a methide (R$_3$C$^-$), nitrate ion (NO$_3^-$), or nitrite ion (NO$_2^-$). In the formula, each R may be independently a hydrogen atom, a halogen atom (fluorine, chlorine, bromine, iodine), a substituted or unsubstituted alkyl, alkenyl, alkynyl, cycloalkyl, aryl, aralkyl, arylalkyl, acyl or sulfonyl group, or the like. A heteroatom such as an oxygen atom, a nitrogen atom and a sulfur atom may be contained in the main chain or ring of the group R, and a part or all of hydrogen atoms on the carbon atom of the group R may be replaced with fluorine atoms. In the case where a plurality of R's are present in the anion, these R's may be the same or different. Because of good compatibility with a fluoropolymer in general, it is advantageous that a part or all of hydrogen atoms on the carbon atom of the group R in the anion be replaced by fluorine atoms and it is advantageous that the anion contains a perfluoroalkyl group.

Examples of the anion containing a perfluoroalkyl group, which can be advantageously used, include a bis(perfluoroalkylsulfonyl)imide ((RfSO$_2$)$_2$N$^-$), a perfluoroalkylsulfonate (RfSO$_3^-$) and a tris(perfluoroalkylsulfonyl)methide ((RfSO$_2$)$_3$C$^-$) (wherein Rf represents a perfluoroalkyl group). The carbon number of the perfluoroalkyl group may be, for example, from at least 1, 2, 3 or even 4 to at most 8, 10, 12, 15, or even 20. Specific examples of the bis(perfluoroalkylsulfonyl)imide include: bis(trifluoromethanesulfonyl)imide, bis(pentafluoroethanesulfonyl)imide, bis(heptafluoropropanesulfonyl)imide and bis(nonafluorobutanesulfonyl)imide. Specific examples of the perfluoroalkylsulfonate include: trifluoromethanesulfonate, pentafluoroethanesulfonate, heptafluoropropanesulfonate and nonafluorobutanesulfonate. Specific examples of the tris(perfluoroalkylsulfonyl)methide include: tris(trifluoromethanesulfonyl)methide, tris(pentafluoroethanesulfonyl)methide, tris(heptafluoropropanesulfonyl)methide, tris(nonafluorobutanesulfonyl)methide, and a combination thereof.

As for the ionic liquid composed of the above-described cation and anion, N-methyl-N-propylpiperidinium bis(trifluoromethanesulfonyl)imide, N-methyl-N-propylpiperidinium bis(trifluoromethanesulfonyl)imide, N-ethyl-N'-methylimidazolium bis(trifluoromethanesulfonyl)imide, N,N,N-trimethyl-N-hexylammonium bis(trifluoromethanesulfonyl)imide and N-methyl-N,N,N-tributylammonium bis(trifluoromethanesulfonyl)imide can be advantageously used, because of excellent heat resistance and good compatibility with the fluoropolymer. N-methyl-N-propylpiperidinium bis(trifluoromethanesulfonyl)imide, N,N,N-trimethyl-N-hexylammonium bis(trifluoromethanesulfonyl) imide and N-methyl-N,N,N-tributylammonium bis(trifluoromethanesulfonylimide, which are free of an aromatic ring, are particularly suitable for non-coloring applications.

The ionic liquid is blended with a partially fluorinated elastomer gum that comprises a partially fluorinated polymer to form the compositions of the present disclosure.

As used herein, a polymer refers to a macromolecule derived from repeated monomeric units, wherein the macromolecule has a molecular weight greater than 20,000 grams/mole. The partially fluorinated polymer as disclosed herein comprises hydrogen atoms as well as fluorine atoms along the carbon backbone of the polymer. The partially fluorinated polymer should comprise at least 50%, 60%, or even 70% of amount of fluorine atoms by weight along the carbon backbone of the polymer; and at most 75 or 76 of amount of fluorine atoms by weight along the carbon backbone of the polymer. The partially fluorinated polymer should also comprise at least 0.1%, but no more than 40%, 25%, 10%, 5%, or even 1% hydrogen atoms by weight along the carbon backbone of the polymer.

The partially fluorinated polymer may be derived from one or more fluorinated monomer(s) such as tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluorovinyl ethers (including perfluoroallyl vinyl ethers and perfluoroalkoxy vinyl ethers), perfluoroallyl ethers (including perfluoroalkyl allyl ethers and perfluoroalkoxy allyl ethers), perfluoroalkyl vinyl monomers, and combinations thereof.

Suitable perfluoroalkyl vinyl monomers correspond to the general formula: $CF_2\!=\!CF\!-\!R^d_f$ or $CH_2\!=\!CH\!-\!R^d_f$ wherein $R^d_f$ represents a perfluoroalkyl group of 1-10, or even 1-5 carbon atoms.

Examples of perfluorovinyl ethers that can be used in the present disclosure include those that correspond to the formula: $CF_2\!=\!CF\!-\!O\!-\!R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2\!=\!CFO(R^a_f O)_n (R^b_f O)_m R^c_f$ wherein $R^a_f$ and $R^b_f$ are different linear or branched perfluoroalkylene groups of 1-6 carbon atoms, in particular 2-6 carbon atoms, m and n are independently 0-10 and $R^c_f$ is a perfluoroalkyl group of 1-6 carbon atoms. Specific examples of perfluorinated vinyl ethers include perfluoro(methyl vinyl)ether (PMVE), perfluoro(ethyl vinyl)ether (PEVE), perfluoro(n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3\!-\!(CF_2)_2\!-\!O\!-\!CF(CF_3)\!-\!CF_2\!-\!O\!-\!CF(CF_3)\!-\!CF_2\!-\!O\!-\!CF\!=\!CF_2$.

Examples of perfluoroallyl ethers that can be used in the present disclosure include those that correspond to the formula: $CF_2\!=\!CF(CF_2)\!-\!O\!-\!R_f$ wherein $R_f$ represents a perfluorinated aliphatic group that may contain no, one or more oxygen atoms and up to 10, 8, 6 or even 4 carbon atoms. Specific examples of perfluorinated allyl ethers include: $CF_2\!=\!CF_2\!-\!CF_2\!-\!O\!-\!(CF_2)_n F$ wherein n is an integer from 1 to 5, and $CF_2\!=\!CF_2\!-\!CF_2\!-\!O\!-\!(CF_2)_x\!-\!O\!-\!(CF_2)_y\!-\!F$ wherein x is an integer from 2 to 5 and y is an integer from 1 to 5.

It is well known by those of skill in the art to modify the partially fluorinated polymer during their formation by the addition of small amounts of other copolymerizable monomers, which may or may not contain fluorine substitution, e.g. ethylene, propylene, butylene and the like. Use of these additional monomers (i.e., comonomers) is within the scope of the present disclosure. Generally, these additional monomers would be used at less than 25 mole percent of the fluoropolymer, preferably less than 10 mole percent, and even less than 3 mole percent.

In one embodiment, the partially fluorinated polymer is a copolymer. Exemplary partially fluorinated polymers include: a TFE/propylene copolymer, a TFE/propylene/VDF copolymer, a VDF/HFP copolymer, a TFE/VDF/HFP copolymer, a TFE/ethyl vinyl ether (EVE) copolymer, a TFE/butyl vinyl ether (BVE) copolymer, a TFE/EVE/BVE copolymer, a VDF/$CF_2\!=\!CFOC_3F_7$ copolymer, an ethylene/HFP copolymer, a CTFE/VDF copolymer, a TFE/VDF copolymer, a TFE/VDF/PMVE copolymer, a VDF/TFE/propylene copolymer, a TFE/VDF/PMVE/ethylene copolymer, and a TFE/VDF/$CF_2\!=\!CFO(CF_2)_3OCF_3$ copolymer. In one embodiment, the partially fluorinated polymer is not a VDF/HFP copolymer.

Exemplary fluoropolymers include for example, those produced by 3M Co., St. Paul, Minn.; FE 5522X, FE 5730, FE 5830Q, FE 5840Q, FLS 2530, FLS 2650, FPO 3740, FPO 3741, FT 2320, FT 2350, FT 2430, FT 2481, FC 2110Q, FC 2120, FC 2121, FC 2122, FC 2123, FC 2144, FC 2145, FC 2152, FC 2170, FC 2174, FC 2176, FC 2177D, FC 2178, FC 2179, FC 2180, FC 2181, FC 2182, FC 2211, FC 2230, FC 2260, FC 2261Q, FE 5520X, FE 5542X, FE 5610, FE 5610Q, FE 5620Q, FE 5621, FE 5622Q, FE 5623, FE 5640Q, FE 5641Q, FE 5642, FE 5643Q, FE 5660Q, FG 5630Q, FG 5661X, FG 5690Q, FX 3734, FX 3735, and FX 11818.

In the present disclosure, the partially fluorinated polymer may be polymerized in the presence of a chain transfer agent and/or cure site monomers to introduce cure sites into the fluoropolymer.

Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure-site monomers, if used, comprise at least one of a bromine, iodine, and/or nitrogen cure moiety.

In one embodiment, the cure site monomers may be derived from one or more compounds of the formula: a) $CX_2\!=\!CX(Z)$, wherein: (i) X each is independently H or F; and (ii) Z is I, Br, $R_f\!-\!U$ wherein U=I or Br and $R_f$=a perfluorinated or partially perfluorinated alkylene group optionally containing 0 atoms or (b) $Y(CF_2)_q Y$, wherein: (i) Y is Br or I or Cl and (ii) q=1-6. In addition, non-fluorinated bromo- or iodo-olefins, e.g., vinyl iodide and allyl iodide, can be used. In some embodiments, the cure site monomers are derived from one or more compounds selected from the group consisting of $CH_2=CHI$, $CF_2=CHI$, $CF_2=CFI$, $CH_2=CHCH_2I$, $CF_2=CFCF_2I$, $ICF_2CF_2CF_2I$, $CH_2=CHCF_2CF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CH_2=CHBr$, $CF_2=CHBr$, $CF_2=CFBr$, $CH_2=CHCH_2Br$, $CF_2=CFCF_2Br$, $CH_2=CHCF_2CF_2Br$, $CF_2=CFOCF_2CF_2Br$, $CF_2=CFCl$, $CF_2=CFCF_2Cl$, and combinations thereof.

In another embodiment, the cure site monomers comprise nitrogen-containing cure moieties. Useful nitrogen-containing cure site monomers include nitrile-containing fluorinated olefins and nitrile-containing fluorinated vinyl ethers, such as: perfluoro(8-cyano-5-methyl-3,6-dioxa-1-octene); $CF_2=CFO(CF_2)_LCN$ wherein L is an integer from 2 to 12; $CF_2=CFO(CF_2)_uOCF(CF_3)CN$ wherein u is an integer from 2 to 6; $CF_2=CFO[CF_2CF(CF_3)O]_q(CF_2O)_yCF(CF_3)CN$ or $CF_2=CFO[CF_2CF(CF_3)O]_q(CF_2)_yOCF(CF_3)CN$ wherein q is an integer from 0 to 4 and y is an integer from 0 to 6; or $CF_2=CF[OCF_2CF(CF_3)]_rO(CF_2)_tCN$ wherein r is 1 or 2, and t is an integer from 1 to 4; and derivatives and combinations of the foregoing. Examples of a nitrile-containing cure site monomer include $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, $CF_2=CFOCF_2CF(CF_3)OCF_2CF_2CN$; and combinations thereof.

The partially fluorinated polymer is a partially fluorinated elastomer gum obtained generally by polymerizing one or more types of monomers. The partially fluorinated elastomer gum may or may not be crosslinked. Crosslinking of the partially fluorinated elastomer gum can be performed generally with a peroxide, a polyol, or a polyamine cure system (or curative).

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid such as diallyl ether of glycerin, triallylphosphoric acid, diallyl adipate, diallylmelamine and triallyl isocyanurate (TAIC), tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide. Examples of the organic peroxide include benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluoropolymer. Other conventional radical initiators are suitable for use with the present disclosure.

The crosslinking using a polyol is performed generally by using a polyol compound as a crosslinking agent, a crosslinking aid such as ammonium salt, phosphonium salt and iminium salt, and a hydroxide or oxide of a divalent metal such as magnesium, calcium, or zinc. Examples of the polyol compound include bisphenol AF, bisphenol A, bisphenol S, dihydroxybenzophenone, hydroquinone, 2,4,6-trimercapto-S-triazine, 4,4'-thiodiphenol, and a metal salt thereof.

The crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

This crosslinking agent, crosslinking aid, and acid-receiving agent composed of a hydroxide, oxide, or the like of a divalent metal each may be used in a conventionally known amount, and the amount used can be appropriately determined by one skilled in the art while taking into consideration the miscibility with the fluoropolymer, mechanical strength of the crosslinked fluoropolymer, profitability and the like. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the fluoropolymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the fluoropolymers.

In the present disclosure, a low amount of the ionic liquid (i.e., less than 10, 8, 6, 5, 3, 2, or even 1 weight % of the ionic liquid based on the total weight of the partially fluorinated polymer and the ionic liquid) is present in the composition. However, a sufficient amount of ionic liquid (e.g., greater than 0.0005 wt % of the ionic liquid based on the total weight of the partially fluorinated polymer and the ionic liquid) must be used, to elicit some improvement (whether it be with respect to processing or final product properties) in the composition of the present disclosure versus when no ionic liquid is present.

In one embodiment, the amount of the ionic liquid is greater than 0.010, 0.020, 0.050, 0.070, 0.10, 0.20, or even 0.50 wt % and less than 1.0, 0.90, 0.80, or even 0.60 wt % based on the total weight of the ionic liquid and the partially fluorinated polymer.

In another embodiment, the amount of the ionic liquid is greater than 1.0, 2.0, or even 4.0 wt % and less than 10.0, 9.0, 8.0, or even 6.0 wt % based on the total weight of the ionic liquid and the partially fluorinated polymer.

The present disclosure is directed to a composition comprising a miscible blend of an ionic liquid with a partially fluorinated polymer. As used herein, a miscible blend means the blend of the ionic liquid and the partially fluorinated polymer is a molecular level dispersion, which is different from a microphase separation or dispersion, e.g., gel, and the miscible blend will behave as one component. In other words, the miscible blend will have a single glass transition temperature ($T_g$). In the present disclosure, the single $T_g$ of the miscible blend will be substantially the same as the $T_g$ of the partially fluorinated polymer. If a blend of ionic liquid and fluoropolymer is immiscible, two $T_g$'s would be observed and at least one of the $T_g$'s would be the same as the $T_g$ for the fluoropolymer.

The glass transition temperature ($T_g$) is the temperature at which a polymer transitions from an amorphous state to a glassy state. The $T_g$ may be measured according to any technique known to those of ordinary skill in the art. For example differential scanning calorimetry (DSC), or determining the peak temperature of tan δ calculated from loss modulus (G") divided by storage modulus (G') (tan δ=G"/G') using a dynamic mechanical analyzer may be used to determine the glass transition temperature. When using the same measuring technique, the $T_g$ of the miscible blend according to the present disclosure (comprising the partially fluorinated polymer (either cured or uncured) and the ionic liquid) will be substantially the same as the $T_g$ of the partially fluorinated polymer (either cured or uncured). In other words, when adding the ionic liquid to the partially fluorinated polymer, the $T_g$ of the partially fluorinated polymer blended with the ionic liquid is less than 3, 2, 1, or even 0° C. different than the $T_g$ of the partially fluorinated polymer itself.

It has been discovered that by adding low amounts of the ionic liquid to a partially fluorinated polymer, a composition comprising the elastomer gum can have among other things, improved cure speed, lower Mooney viscosity, and/or improved compression set.

Ionic liquids are known as an ion conductive liquid. See, for example, Masayoshi Watanabe and Tomoo, *Solid State Ionics*, vol. 86-88 (1996) 353-356. Because a low amount (e.g., less than 10 wt %) of the ionic liquid to a partially fluorinated polymer is used, in one embodiment, the ionic liquid does not substantially change the ionic character of the partially fluorinated polymer. Although the addition of low amounts of ionic liquid may change the conductivity of the fluoropolymer gum, as used herein, substantially change, means that the addition of the ionic liquid to the partially fluorinated polymer, does not make the partially fluorinated polymer go from a non-conductive material (i.e., less than $10^{-8}$ S/cm) to a semi-conductive (i.e., between $10^{-8}$ S/cm and $10^1$ S/cm) or a conductive material (i.e., greater than $10^1$ S/cm), nor make the partially fluorinated polymer go from a semi-conductive material to a conductive material.

In one embodiment of the present disclosure, the composition is non-conductive meaning that it has a conductivity of less than about $1\times10^{-8}$ S/cm, $1\times10^{-9}$ S/cm, or even $1\times10^{-10}$ S/cm.

The amount of ionic liquid used and its impact on the resulting composition can vary based on the ionic liquid used, the partially fluorinated polymer composition, and the cure system employed. For example, in one embodiment, when a low amount of ionic liquid is used, the compression set increases. In another embodiment, when a low amount of ionic liquid is used, the compression set compression set is unchanged or slightly lower, however, the cure time shortens. In another embodiment, when a low amount of ionic liquid is used, the Mooney viscosity decreases.

Although not wanting to be limited by theory, it is believed that in one embodiment, the ionic liquid, which may have a solubility for the polymer and the curing agent, can improve the homogeneity of the composition and thus, improve, for example, the cure speed and/or the compression set.

As manufacturers move away from solvents, due to expense and/or environmental reasons, in one embodiment, an ionic liquid may be used to replace the traditional volatile solvents (such as ethanol or methanol), which have been used to dissolve or disperse the solid curative when incorporating it into the polymer.

In one embodiment, the solid curative (or curing agent) is soluble (i.e., colorless and clear or hazy) in the ionic liquid when rolled at 2.4 rpms (revolutions per minute) for 1 hour at 23° C. In one embodiment, the solid curative (or curing agent) is soluble (i.e., colorless and clear or hazy) in the ionic liquid when rolled at 2.4 rpms for 16 hrs at 40° C.

For the purpose of, for example, enhancing the strength or imparting the functionality, conventional adjuvants, such as, for example, acid acceptors, process aids, or colorants may be added to the composition.

Such fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10).

In one embodiment, the composition comprises less than 40, 30, 20, 15, or even 10% by weight of the inorganic filler.

Conventional adjuvants may also be incorporated into the composition of the present disclosure to enhance the properties of the resulting composition. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

A solution or liquid dispersion containing the partially fluorinated elastomer gum, the ionic liquid and other components described above may be prepared using a solvent such as ketone (e.g., acetone, methyl ethyl ketone, methyl isobutyl ketone), ether (e.g., diethyl ether, tetrahydrofuran) and ester (e.g., ethyl acetate, butyl acetate), the solution or liquid dispersion prepared may be coated on the surface of a substrate such as paper, fiber, film, sheet, tape, plate, tube, pipe, tank and vessel, and the solvent may be removed by drying. In this way, an article containing a composition layer and a substrate can be formed.

The method for mixing the partially fluorinated elastomer gum, the ionic liquid and other components described above include, for example, kneading with use of a twin roll for rubber, a pressure kneader or a Banbury mixer.

The mixture may then be processed and shaped such as by extrusion or molding to form an article of various shapes such as sheet, a hose, a hose lining, an o-ring, a gasket, or a seal composed of the composition of the present disclosure. The shaped article may then be heated to cure the gum composition and form a cured elastomer article.

Pressing of the compounded mixture (i.e., press cure) is typically conducted at a temperature of about 120-220° C., preferably about 140-200° C., for a period of about 1 minute to about 15 hours, usually for about 1-15 minutes. A pressure of about 700-20,000 kPa, preferably about 3400-6800 kPa, is typically used in molding the composition. The molds first may be coated with a release agent and prebaked.

The molded vulcanizate can be post cured in an oven at a temperature of about 140-240° C., preferably at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

Compositions of the present disclosure may be used in articles, such as a hose, a gasket, or a seal. These compositions may or may not be cured.

Exemplary embodiments of the present disclosure include, but are not limited to the following:

Embodiment 1

A composition comprising:
(i) a partially fluorinated elastomer gum comprising a partially fluorinated polymer; and
(ii) less than 10 wt % of an ionic liquid based on the total weight of the partially fluorinated polymer and the ionic liquid.

Embodiment 2

The composition of embodiment 1, wherein the partially fluorinated polymer has a glass transition temperature and the addition of the ionic liquid does not substantially change the glass transition temperature.

Embodiment 3

The composition according to any one of the previous embodiments, wherein the amount of the ionic liquid is greater than 0.01 wt % and less than 1.0 wt % based on the total weight of the ionic liquid and the partially fluorinated polymer.

Embodiment 4

The composition according to any one of embodiments 1-2, wherein the amount of the ionic liquid is greater than 1.0 wt % and less than 10.0 wt % based on the total weight of the ionic liquid and the partially fluorinated polymer.

Embodiment 5

The composition according to any one of the previous embodiments, wherein the partially fluorinated polymer is a copolymer.

Embodiment 6

The composition according to any one of the previous embodiments, wherein the ionic liquid has a melting point of about 100° C. or less.

Embodiment 7

The composition according to any one of the previous embodiments, wherein the partially fluorinated polymer is derived from one or more fluorinated monomer(s) selected from at least one of tetrafluoroethylene, vinyl fluoride, vinylidene fluoride, hexafluoropropylene, pentafluoropropylene, trifluoroethylene, trifluorochloroethylene, a perfluoroalkyl vinyl ether, a perfluoroalkyl allyl ether, a perfluoroalkoxy vinyl ether, and a perfluoroalkoxy allyl ether.

Embodiment 8

The composition according to any one of the previous embodiments, wherein the partially fluorinated polymer is a vinylidene fluoride/hexafluoropropylene copolymer, a tetrafluoroethylene/vinylidene fluoride/hexafluoropropylene copolymer, a tetrafluoroethylene/propylene copolymer, a tetrafluoroethylene/vinylidene fluoride/PMVE copolymer, a tetrafluoroethylene/vinylidene fluoride/propylene copolymer, a chlorotrifluoroethylene/vinylidene fluoride copolymer, or an ethylene/hexafluoropropylene copolymer.

Embodiment 9

The composition according to any one of embodiment 1-7, with the proviso that the partially fluorinated polymer is not a vinylidene fluoride/hexafluoropropylene copolymer.

Embodiment 10

The composition according to any one of the previous embodiments, wherein the anion of the ionic liquid comprises a perfluoroalkyl group.

Embodiment 11

The composition according to any one of the previous embodiments, wherein the cation portion of the ionic liquid is selected from N-ethyl-N'-methylimidazolium N-methyl-N-propylpiperidinium, N,N,N-trimethyl-N-propylammonium, N-methyl-N,N,N-tripropylammonium, N,N,N-trimethyl-N-butylammoniuim, N,N,N-trimethyl-N-methoxyethylammonium, N-methyl-N,N,N-tris(methoxyethyl)ammonium, N-methyl-N,N,N-tributylammonium, N,N,N-trimethyl-N-hexylammonium, N,N-diethyl-N-methyl-N-(2-methoxyethyl)ammonium, 1-propyl-tetrahydrothiophenium, 1-butyl-tetrahydrothiophenium, glycidyltrimethylammonium, N-ethyl-N-methylmorphonium, N,N,N-trioctylammonium, N-methyl-N,N,N-trioctylammonium, N-methyl-N,N,N-tributylammonium, N,N-dimethyl-N-octyl-N-(2-hydroxyethyl)ammonium, and a combination thereof.

Embodiment 12

The composition according to any one of the previous embodiments, wherein the anion portion of the ionic liquid is selected from bis(trifluoromethanesulfonyl)imide, bis(pentafluoroethanesulfonyl)imide, bis(heptafluoropropanesulfonyl)imide, bis(nonafluorobutanesulfonyl)imide, trifluoromethanesulfonate, pentafluoroethanesulfonate, heptafluoropropanesulfonate, nonafluorobutanesulfonate, tris(trifluoromethanesulfonyl)methide, tris(pentafluoroethanesulfonyl)methide, tris(heptafluoropropanesulfonyl)methide, tris(nonafluorobutanesulfonyl)methide, and a combination thereof.

Embodiment 13

The composition according to any one of the previous embodiments, wherein the partially fluorinated polymer further comprises a cure site, wherein the cure-site is selected from at least one of a bromine, iodine, and nitrogen cure moiety.

Embodiment 14

The composition according to embodiment 13, wherein the cure site is selected from cure site monomers derived from at least one of: $CF_2=CFBr$, $CF_2=CHBr$, $ICF_2CF_2CF_2CF_2I$, $CH_2I_2$, $BrCF_2CF_2Br$, $CF_2=CFO(CF_2)_3-OCF_2CF_2Br$, $CF_2=CFOCF_2CF_2Br$, $CH_2=CHCF_2CF_2Br$, $CH_2=CHCF_2CF_2I$, $CF_2=CFCl$, $CH_2=CHI$, $CF_2=CHI$, $CF_2=CFI$, $CH_2=CHCH_2I$, $CF_2=CFCF_2I$, $CF_2=CFCH_2CH_2I$, $CF_2=CFCF_2CF_2I$, $CH_2=CH(CF_2)_6CH_2CH_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CH_2=CHBr$, $CH_2=CHCH_2Br$, $CF_2=CFCF_2Br$, $CF_2=CFO(CF_2)_5CN$, $CF_2=CFOCF_2CF(CF_3)OCF_2CF_2CN$, $CF_2=CFOCF_2CF(CF_3)OCF_2CF(CF_3)CN$, $CF_2=CFOCF_2CF_2CF_2OCF(CF_3)CN$, and $CF_2=CFOCF_2CF(CF_3)OCF_2CF_2CN$.

Embodiment 15

The composition according to any one of embodiments 13-14, wherein the partially fluorinated elastomer gum is peroxide curable.

Embodiment 16

The composition according to any one of the previous embodiments, further comprising a peroxide, and optionally, a crosslinking aid.

Embodiment 17

The composition according to embodiment 16, wherein the peroxide is selected from at least one of: benzoyl peroxide, dichlorobenzoyl peroxide, dicumyl peroxide, 2,5-dimethyl-2,5-di(tbutylperoxy)hexane, di-t-butyl peroxide, t-butylperoxy benzoate, and 2,5-dimethyl-2,5-di(t-butylperoxy)hexane-3, laurel peroxide.

Embodiment 18

The composition according to any one of embodiments 13-14, wherein the partially fluorinated elastomer gum is bisphenol or amine curable.

Embodiment 19

The composition according to any one of the previous embodiments, further comprising bisphenol A.

Embodiment 20

The composition according to any one of the previous embodiments further comprising an inorganic filler.

Embodiment 21

The composition according to embodiment 20, wherein the inorganic filler is selected from at least one of carbon black, graphite, clay, silica, talc, diatomaceous earth, barium sulfate, wollastonite, calcium carbonate, calcium fluoride, titanium oxide, and iron oxide.

Embodiment 22

The composition according to any one of the previous embodiments, wherein the composition comprises less than 20% by weight of the inorganic filler.

Embodiment 23

The composition according to any one of the previous embodiments further comprising a organic filler selected from at least one of a PTFE powder and a PFA powder.

Embodiment 23

The composition according to any one of the previous embodiments, wherein the composition is non-conductive.

Embodiment 24

An article comprising the composition according to any one of the previous embodiments.

Embodiment 25

A cured article comprising the composition according to any one of embodiments 1-23.

Embodiment 26

The cured article according to embodiment 25, wherein the cured article is a hose, a gasket, or a seal.

Embodiment 27

A method comprising blending (i) partially fluorinated elastomer gum comprising a partially fluorinated polymer and (ii) less than 10 wt % of an ionic liquid based on the total weight of the partially fluorinated polymer and the ionic liquid.

Embodiment 28

The method of embodiment 27, wherein the partially fluorinated polymer has a glass transition temperature and the addition of the ionic liquid does not substantially change the glass transition temperature.

Embodiment 29

The method of any one of embodiments 27-28, wherein the amount of the ionic liquid is greater than 0.01 wt % and less than 1.0 wt % based on the total weight of the ionic liquid and the partially fluorinated polymer.

Embodiment 30

The method of any one of embodiments 27-28, wherein the amount of the ionic liquid is greater than 1.0 wt % and less than 10.0 wt % based on the total weight of the ionic liquid and the partially fluorinated polymer.

Embodiment 31

The method of any one of embodiments 27-30, wherein the partially fluorinated polymer is a copolymer.

Embodiment 32

The method of any one of embodiments 27-31, wherein the ionic liquid has a melting point of about 100° C. or less.

Embodiment 33

The method of any one of embodiments 27-32, with the proviso that the partially fluorinated polymer is not a vinylidene fluoride/hexafluoropropylene copolymer.

Embodiment 34

The method of any one of embodiments 27-33, wherein the anion of the ionic liquid comprises a perfluoroalkyl group.

Embodiment 35

The method of any one of embodiments 27-34, further comprising curing the partially fluorinated elastomer gum with a curing system selected from at least one of a peroxide system, a polyol system, and a polyamine system.

Embodiment 36

Use of the cured article of embodiment 25 as a hose, gasket or a seal.

Embodiment 37

A composition comprising:
(i) a cured partially fluorinated elastomer comprising a partially fluorinated polymer; and
(ii) less than 10 wt % of an ionic liquid based on the total weight of the partially fluorinated polymer and the ionic liquid.

Embodiment 38

The composition of embodiment 37, wherein the cured partially fluorinated polymer has a glass transition temperature and the addition of the ionic liquid does not substantially change the glass transition temperature.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: dNm=deci Netwon meter; g=gram, kg=kilograms, min=minutes, mol=mole, cal=calories, cc=cubic centimeter, cm=centimeter, min=minute; mm=millimeter, mL=milliliter, L=liter, N=Newton, psi=pressure per square inch, MPa=megaPascals, rad/s=radians per second, and wt=weight, MU=Mooney Units, PAVE=perfluoroalkylvinyl ether, E#=Example Number and CE #=Comparative Example Number, S=Siemens, and phr=parts by weight per one hundred parts by weight of rubber.

| MATERIALS TABLE | |
|---|---|
| Name | Source |
| F1 | A 66 wt % F high Mooney viscosity (110 MU) VDF/HFP copolymer available under the trade designation "3M DYNEON FC 2178" from 3M Co., St. Paul, MN comprising about 78 mol % VDF and about 22 mol % HFP |
| F2 | A 66 wt % F low Mooney viscosity (28 MU) VDF/HFP copolymer available under the trade designation "3M DYNEON FC 2145" from 3M Co., comprising about 78% VDF and about 22 mol % HFP |
| F3 | VDF/HFP copolymer Mooney viscosity (25 MU) VDF/HFP copolymer available under the trade designation "3M DYNEON FC 2162" from 3M Co., comprising about 78% VDF and about 22 mol % HFP |
| F4 | A 67 wt % F terpolymer of TFE/VDF and HFP commercially available from 3M Company, St. Paul, MN under the trade designation "3M DYNEON FPO 3730" |
| F5 | A 69.5 wt % F terpolymer of TFE/VDF and HFP commercially available from 3M Company, St. Paul, MN under the trade designation "3M DYNEON FPO 3740" |
| F6 | 67 wt % F terpolymer of TFE, VDF and PAVE available under the trade designation "3M DYNEON LTFE-6400" from 3M Company, St. Paul, MN |
| F7 | A 66 wt % F high Mooney viscosity (142 MU) VDF/HFP copolymer available under the trade designation "3M DYNEON FC 2299" from 3M Co., St. Paul, MN comprising about 78 mol % VDF and about 22 mol % HFP |
| F8 | A 66 wt % F medium low viscosity (23 MU) VDF/HFP cure incorporated gum available under the trade designation "3M DYNEON FC 2120" from 3M Co., St. Paul, MN. |
| IL#1 | Tri-n-butylmethylammonium bis-(trifluoromethanesulfonyl)imide; $(n-C_4H_9)_3(CH_3)N^+$ $^-N(SO_2CF_3)_2$ commercially available under the trade designation "3M Ionic Liquid Antitstat FC-4400" from 3M Co., St. Paul, MN |
| IL#2 | 1-ethyl-3-methylimidazolium-bis(trifluoromethylsulfonyl)imide commercially available from Wako Pure Chemical Industries, Ltd., Tokyo, Japan, under the trade designation "EMI-TFSI". |
| Carbon | Carbon black available under the trade designation "THERMAX FLOFORM N-990" from CanCarb Ltd., Medicine Hat, Canada |
| Cure 1 | 70% by weight solution of bisphenol AF(4,4'-[2,2,2-trifluoro-1-(trifluoromethyl)ethylidene]bis-phenol, available from Aldrich Chem. Co.) in ethanol. |

-continued

MATERIALS TABLE

| Name | Source |
|---|---|
| Cure 2 | 43% by weight solution of bisphenol AF reaction products with benzene, chlorine and sulfur chloride ($S_2Cl_2$) (CAS RN [921213-47-0]) |
| Cure 3 | 43% by weight of a 1:1 complex of triphenylbenzylphosphonium with bisphenol AF in methanol. |
| Cure 4 | 2,5-dimethyl-2,5-di(t-butylperoxy)-hexane, 50% active, available under the trade designation "VAROX DBPH-50" from Vanderbilt Chemicals, LLC., Norwalk, CT. |
| Coagent | Triallyl isocyanurate, 98%, available under the trade designation "TAIC" from Nippon Kasei, Japan |
| MgO | Magnesium oxide available under the trade designation "ELASTOMAG 170" from Morton International, Inc., Danvers, MA. |
| Ca(OH)$_2$ | Calcium hydroxide available under the trade designation "Calcium Hydroxide HP-XL" from Hallstar Co., Chicago, IL. |

Testing

Mooney Viscosity

The Mooney viscosity of the compounded formulations were tested following a procedure as disclosed in ASTM D-1646-07 "Standard Test Method for Rubber-Viscosity, Stress Relaxation, and Pre-Vulcanization Characteristics (Mooney Viscometer)". The pre heat time was 1 min at 121° C. and the test time was 10 min. at 121° C.

MDR

The cure rheology of the compounded fluoroelastomer gum sample was investigated by testing the uncured, compounded mixtures using the Alpha Technology RPA 2000 with MDR (Moving Die Rheometer) mode and the procedure described in ASTM D 5289-95 at 177° C., no preheat, 12 minute elapsed time and a 0.5° C. arc. minimum torque (ML) and maximum torque (MH), i.e., highest torque attained during specified period of time when no plateau or maximum was obtained were reported. Also reported were: Ts2 (time for torque to increase 2 units above ML), T50 (time for torque to reach ML+0.5[MH−ML]), and T90 (time for torque to reach ML+0.9[MH−ML]).

Physical Property

The physical properties of the cured fluoroelastomer gums (cured sheets) were tested following a similar procedure as disclosed in ASTM D 412-06a "Standard Test Methods for Vulcanized Rubber and Thermoplastic Elastomers-Tension" for tensile set after break (Tb), and % elongation at break (Eb) and ASTM D 2240-05 "Standard Test Method for Rubber Property-Durometer Hardness" for Shore A Hardness (HS).

Compression Set

The compression set of the cured fluoroelastomer gums (cured buttons) were tested following a similar procedure as disclosed in ASTM D 395-03 "Standard Test Methods for Rubber Property-Compression Set" Method B.

Glass Transition Temperature

The glass transition temperature was determined by a peak temperature of tan δ calculated from storage modulus (G') and loss modulus (G") using a dynamic mechanical analyzer, AR 2000EX (manufactured by TA Instruments, New Castle, Del.) in accordance with ASTM D 6204-07 "Standard Test Method for Rubber-Measurement of Unvulcanized Rheological Properties Using Rotorless Shear Rheometers". Torsion rectangular clamps with an environmental test chamber (ETC) were used as a jig. The size of the rectangular sample was approximately 2 mm thick, 6.4 mm wide, and 24.5 mm long. The storage modulus (G') and loss modulus (G") were measured by a temperature sweep from −60° C. to 25° C. at the rate of 5° C. per minute and at the frequency (ω) of 1.0 Hz (6.3 rad/s) and the stain of 5%.

Resistivity and Conductivity

The volume resistivity and conductivity of the samples were investigated by testing a post cured sheet using a resistance/resistivity meter with a prove (available as Model 872 "Wide Range Resistance Meter" with Model 803B prove from Electro-Tech Systems, Inc., Glenside, Pa.) at 10 volts following a similar procedure as described in ASTM D 257-07 "Standard Test Methods for DC Resistance or Conductance of Insulating Materials".

Examples 1A to 8B (E1A to E8B) and Comparative Examples 1 to 8 (CE1 to CE8)

The amounts of materials used in preparing the fluoroelastomer gums of the Examples and Comparative Examples are shown below in Tables 1-4, wherein the amounts are given in parts by weight.

To prepare the fluoroelastomer gums, the fluoropolymer, ionic liquid, and Cure 1, Cure 2, or Cure 3, if used, were compounded together on a 6-inch (152-mm) diameter open roll mill. After the mixture was homogeneous, the Mooney Viscosity was measured using the "Mooney Viscosity" Method described above. The Mooney Viscosity for the samples is shown in Tables 5-8 below. Then, if used, Carbon, Cure 4, Coagent, MgO, and Ca(OH)$_2$ was placed in the center of the polymer band and compounded again on the two roll mill.

TABLE 1

| Material | CE1 | E1A | E1B | E1C | E1D | E1E | E1F | E1G | CE7 | E7 |
|---|---|---|---|---|---|---|---|---|---|---|
| F1 | 100 | 100 | 100 | 100 | 100 | 100 | 100 | 100 | 100 | 100 |
| IL#1 | 0 | 0.1 | 0.2 | 0.5 | 1 | 2.5 | 5 | 10 | 0 | 0 |
| IL#2 | 0 | 0 | 0 | 0 | 0 | 0 | 0 | 0 | 0 | 0.1 |
| Cure 1 | 2.5 | 2.5 | 2.5 | 2.5 | 2.5 | 2.5 | 2.5 | 2.5 | 2.5 | 2.5 |

TABLE 1-continued

| Material | CE1 | E1A | E1B | E1C | E1D | E1E | E1F | E1G | CE7 | E7 |
|---|---|---|---|---|---|---|---|---|---|---|
| Cure 2 | 1.21 | 1.21 | 1.21 | 1.21 | 1.21 | 1.21 | 1.21 | 1.21 | 1.21 | 1.21 |
| Cure 3 | 0.82 | 0.82 | 0.82 | 0.82 | 0.82 | 0.82 | 0.82 | 0.82 | 0.82 | 0.82 |

TABLE 2

| Material | CE2 | E2 | CE3 | E3 | CE4 | E4A | E4B | E4C | E4D |
|---|---|---|---|---|---|---|---|---|---|
| F2 | 100 | 100 | 0 | 0 | 0 | 0 | 0 | 0 | 0 |
| F3 | 0 | 0 | 100 | 100 | 0 | 0 | 0 | 0 | 0 |
| F4 | 0 | 0 | 0 | 0 | 100 | 100 | 100 | 100 | 100 |
| IL#1 | 0 | 0.1 | 0 | 0.1 | 0 | 0.1 | 1 | 5 | 10 |
| Cure 1 | 2.5 | 2.5 | 2.5 | 2.5 | 0 | 0 | 0 | 0 | 0 |
| Cure 2 | 1.21 | 1.21 | 1.21 | 1.21 | 0 | 0 | 0 | 0 | 0 |
| Cure 3 | 0.82 | 0.82 | 0.82 | 0.82 | 0 | 0 | 0 | 0 | 0 |
| Cure 4 | 0 | 0 | 0 | 0 | 2 | 2 | 2 | 2 | 2 |
| Coagent | 0 | 0 | 0 | 0 | 3 | 3 | 3 | 3 | 3 |
| Carbon | 30 | 30 | 30 | 30 | 35 | 35 | 35 | 35 | 35 |
| MgO | 3 | 3 | 3 | 3 | 0 | 0 | 0 | 0 | 0 |
| Ca(OH)$_2$ | 6 | 6 | 6 | 6 | 0 | 0 | 0 | 0 | 0 |

TABLE 3

| Material | CE5 | E5A | E5B | CE6 | E6A | E6B | E6C |
|---|---|---|---|---|---|---|---|
| F5 | 100 | 100 | 100 | 0 | 0 | 0 | 0 |
| F6 | 0 | 0 | 0 | 100 | 100 | 100 | 100 |
| IL#1 | 0 | 1 | 5 | 0 | 1 | 5 | 10 |
| Cure 4 | 2 | 2 | 2 | 2 | 2 | 2 | 2 |
| Coagent | 3 | 3 | 3 | 3 | 3 | 3 | 3 |
| Carbon | 35 | 35 | 35 | 35 | 35 | 35 | 35 |

TABLE 4

| Material | CE8 | E8A | E8B |
|---|---|---|---|
| F7 | 100 | 100 | 100 |
| IL#1 | 0 | 5 | 10 |
| Cure 1 | 1.72 | 1.72 | 1.72 |
| Cure 2 | 0.78 | 0.78 | 0.78 |

The compounded fluoroelastomer gum samples above were then tested for cure properties following the "MDR" Method described above. The results are shown in Tables 5-8 below.

For physical property measurements the compounded fluoroelastomer gum samples were press-cured using a 15×15 cm, 2 mm thick mold at the temperatures and times indicated in Tables 5-8. Then the press-cured sheet was post cured at the temperatures and times indicated in Tables 5-8. The dumbbells for physical properties were cut from the cured sheets with ASTM Die D. The samples after they were press-cured and then post-cured were tested for physical properties using the "Physical Properties" Method described above. The post-cured sheet samples were also tested using the "Glass Transition Temperature" and "Resistivity and Conductivity" methods described above. The results are shown in Table 5-8.

For compression set testing, the compounded fluoroelastomer gum samples were press-cured using a 1 inch (25 mm) diameter with a 0.5 inch (12.5 mm) thick mold at the temperatures and times indicated in Tables 5-8. The press-cured button was then post cured at the temperatures and times indicated in Tables 5-8. The press-cured and post-cured samples were tested for compression set resistance using the "Compression Set" Method described above. The results are shown in Table 5-8

TABLE 5

| | Testing | CE1 | E1A | E1B | E1C | E1D | E1E | E1F | E1G | CE7 | E7 |
|---|---|---|---|---|---|---|---|---|---|---|---|
| Mooney | Viscosity (MU) | 88.5 | 78.9 | 79.9 | 77.6 | 69.6 | 71.9 | 62.4 | 50.1 | 88.5 | 77.9 |
| MDR | ML (dNm) | 3.3 | 3.6 | 3.7 | 3.7 | 4.2 | 3.6 | 3.3 | 2.8 | 4.3 | 4.3 |
| 177° C. × | MH (dNm) | 24.1 | 31.3 | 31.3 | 31.3 | 34.8 | 32.4 | 31.3 | 28.4 | 34.2 | 35.9 |
| 12 min. | Tan Delta ML | 0.5 | 0.6 | 0.6 | 0.6 | 0.6 | 0.6 | 0.6 | 0.6 | 0.5 | 0.5 |
| | Tan Delta MH | 0.035 | 0.037 | 0.033 | 0.036 | 0.041 | 0.045 | 0.041 | 0.023 | 0.029 | 0.041 |
| | Ts2 (min.) | 3.1 | 1.9 | 1.9 | 1.6 | 0.9 | 1.0 | 0.7 | 0.6 | 2.3 | 1.8 |
| | T50 (min.) | 4.5 | 3.0 | 3.2 | 2.6 | 1.4 | 1.5 | 1.0 | 0.8 | 4.5 | 4.0 |
| | T90 (min.) | 5.7 | 4.3 | 4.2 | 3.4 | 1.9 | 1.9 | 1.3 | 1.1 | 6.5 | 5.8 |

Cure Conditions: Press Cure(Sheet) Cured at 177° C. for 12 min.
Press Cure(Button) Cured at 160° C. for 20 min.
Post Cure cured 230° C. for 24 hours

| | | CE1 | E1A | E1B | E1C | E1D | E1E | E1F | E1G | CE7 | E7 |
|---|---|---|---|---|---|---|---|---|---|---|---|
| Physical | HS | 80 | 75 | 74 | 73 | 77 | 77 | 76 | 74 | 76 | 79 |
| Property | Tb [MPa] | 15.6 | 13.1 | 15.4 | 14.2 | 16.5 | 13.6 | 13.7 | 12.7 | 15.4 | 16.2 |
| | Eb[%] | 164 | 159 | 190 | 168 | 199 | 175 | 173 | 184 | 202 | 189 |
| | Modulus[MPa] | 9.7 | 8.2 | 8 | 7.8 | 7.6 | 7.7 | 8.2 | 6.4 | 7.2 | 8.1 |
| Resistivity (Ω-cm) | | $1.2 \times 10^{12}$ | $6.4 \times 10^{11}$ | $1.8 \times 10^{11}$ | $7.1 \times 10^{10}$ | NT | NT | NT | NT | NT | NT |

TABLE 5-continued

| Testing | CE1 | E1A | E1B | E1C | E1D | E1E | E1F | E1G | CE7 | E7 |
|---|---|---|---|---|---|---|---|---|---|---|
| Conductivity (S/m) | $8 \times 10^{-11}$ | $1.6 \times 10^{-10}$ | $5.6 \times 10^{-10}$ | $1.4 \times 10^{-9}$ | NT | NT | NT | NT | NT | NT |
| Glass transition temperature (° C.) | −11 | NT | NT | NT | −9.4 | NT | −9.5 | NT | NT | NT |
| Compression Set Property when held in compression at 200° C. for 70 hours | | | | | | | | | | |
| Average of 3 tests | 8.3 | 10.6 | 9.3 | 10.5 | 12.6 | 13.2 | 14.3 | 13.9 | 7.0 | 13.1 |
| 1 | 8.3 | 11.2 | 9.1 | 10.5 | 13.6* | 12.3 | 15.1 | 14.3 | 5.9 | 13.6 |
| 2 | 8.0 | 11.5 | 10.0 | 10.9 | 11.6 | 13.1 | 13.6 | 13.5 | 7.9 | 13.0 |
| 3 | 8.7 | 9.2 | 8.7 | 10.2 | 12.6 | 14.1 | 14.3 | 14.0 | 7.3 | 12.6 |

*designates split

NT designates not tested

TABLE 6

| Testing | | CE2 | E2 | CE3 | E3 | CE4 | E4A | E4B | E4C | E4D |
|---|---|---|---|---|---|---|---|---|---|---|
| Mooney Viscosity (MU) | | 25.7 | 25.9 | 23.4 | 23.1 | 38.1 | 36.9 | 37 | 33.3 | 25.6 |
| MDR | ML (dNm) | 0.8 | 0.8 | 0.6 | 0.6 | 1.1 | 0.9 | 1.0 | 0.8 | 0.6 |
| 177° C × | MH (dNm) | 24.0 | 24.4 | 8.0 | 9.1 | 17.5 | 18.4 | 18.4 | 14.8 | 11.8 |
| 12 min. | Tan Delta ML | 1.2 | 1.2 | 1.2 | 1.2 | 0.8 | 0.8 | 0.8 | 0.8 | 0.8 |
| | Tan Delta MH | 0.042 | 0.045 | 0.132 | 0.129 | 0.092 | 0.086 | 0.089 | 0.093 | 0.094 |
| | Ts2 (min.) | 4.9 | 4.5 | 13.5 | 11.4 | 0.7 | 0.6 | 0.6 | 0.6 | 0.6 |
| | T50 (min.) | 6.2 | 5.6 | 14.9 | 12.8 | 1.2 | 1.1 | 1.0 | 0.9 | 0.9 |
| | T90 (min.) | 9.5 | 8.8 | 21.4 | 19.1 | 4.2 | 3.7 | 3.5 | 3.1 | 3.0 |
| Cure Conditions and Properties | | | | | | | | | | |
| Press Cure(Sheet) | | 177° C. for 12 min. | | 180° C. for 30 min. | | 170° C. for 15 min | | | | |
| Press Cure(Button) | | 177° C. for 20 min. | | 180° C. for 30 min. | | 170° C. for 15 min | | | | |
| Post Cure | | 230° C. for 24 hours | | 230° C. for 24 hours | | 200° C. for 8 hours | | | | |
| Physical | HS | 78 | 78 | 68 | 72 | 73 | 70 | 72 | 68 | 63 |
| Property | Tb[MPa] | 13.6 | 13.0 | 9.2 | 9.1 | 18.9 | 19.0 | 19.3 | 15.0 | 14.2 |
| | Eb[%] | 214 | 224 | 331 | 321 | 240 | 241 | 247 | 245 | 306 |
| | Modulus [MPa] | 5.5 | 5.3 | 2.3 | 2.4 | 4.2 | 4.1 | 4.5 | 3.5 | 2.2 |
| Resistivity (ohm-cm) | | $1.1 \times 10^{12}$ | $2.3 \times 10^{11}$ | $6.4 \times 10^{12}$ | $1.1 \times 10^{11}$ | $2.5 \times 10^{13}$ | NT | NT | $2.1 \times 10^{10}$ | NT |
| Conductivity (S/m) | | $9.1 \times 10^{-11}$ | $4.3 \times 10^{-10}$ | $1.6 \times 10^{-11}$ | $9.4 \times 10^{-10}$ | $4 \times 10^{-12}$ | NT | NT | $4.7 \times 10^{-9}$ | NT |
| Compression Set held in compression at 200° C. for 70 hours | | | | | | | | | | |
| Average of 3 tests | | 11.0 | 10.4 | 25.1 | 26.5 | 18.8 | 15.0 | 11.5 | 14.4 | 16.6 |
| 1 | | 11.2 | 11.3 | 24.4 | 25.8 | 18.8 | 15.4 | 11.6 | 13.3 | 15.9 |
| 2 | | 11.2 | 10.6 | 24.1 | 24.9 | 18.0 | 14.8 | 11.5 | 14.2 | 16.5 |
| 3 | | 10.7 | 9.3 | 26.7* | 28.9* | 19.6 | 14.9 | 11.5 | 15.6 | 17.3 |
| Compression Set held in compression at 200° C. for 168 hours | | | | | | | | | | |
| Average of 3 tests | | | NT | | | 28 | 25 | 20 | 22 | 27 |
| 1 | | | | | | 29 | 25 | 20 | 23 | 27 |
| 2 | | | | | | 27 | 25 | 19 | 21 | 25 |
| 3 | | | | | | 29 | 25 | 20 | 23 | 28 |

*designates split

NT designates not tested

TABLE 7

| Testing | | CE5 | E5A | E5B | CE6 | E6A | E6B | E6C |
|---|---|---|---|---|---|---|---|---|
| Mooney Viscosity (MU) | | 41 | 35.4 | 21.5 | 99.7 | 79.9 | 58.9 | 29.2 |
| MDR | ML (dNm) | 1.7 | 1.0 | 0.9 | 3.2 | 3.0 | 2.6 | 2.2 |
| 177° C. × | MH (dNm) | 20.8 | 20.6 | 16.9 | 12.4 | 11.9 | 10.5 | 8.9 |
| 12 min. | Tan Delta ML | 0.9 | 0.8 | 0.8 | 0.5 | 0.4 | 0.4 | 0.4 |
| | Tan Delta MH | 0.098 | 0.090 | 0.080 | 0.099 | 0.101 | 0.086 | 0.087 |
| | Ts2 (min.) | 0.5 | 0.5 | 0.5 | 0.7 | 0.7 | 0.7 | 0.8 |
| | T50 (min.) | 0.9 | 0.8 | 0.8 | 1.0 | 1.0 | 1.0 | 1.0 |
| | T90 (min.) | 3.0 | 2.7 | 2.7 | 3.4 | 3.0 | 3.1 | 3.3 |
| Cure Conditions: Press Cure(Sheet) Cured at 170° C. for 15 min | | | | | | | | |
| Press Cure(Button) Cured at 170° C. for 15 min | | | | | | | | |
| Post Cure Cured at 200° C. for 8 hours | | | | | | | | |
| Physical | HS | 76 | 75 | 71 | 63 | 60 | 58 | 53 |
| Property | Tb[MPa] | 19 | 18.1 | 11.3 | 8.6 | 10.3 | 6.8 | 2.8 |
| | Eb[%] | 194 | 229 | 278 | 185 | 187 | 232 | 176 |
| | Modulus[MPa] | 6.73 | 5.68 | 2.96 | 2.99 | 3.80 | 2.08 | 1.17 |

TABLE 7-continued

| Testing | CE5 | E5A | E5B | CE6 | E6A | E6B | E6C |
|---|---|---|---|---|---|---|---|
| Resistivity (ohm-cm) | 7.1 × $10^{12}$ | 1.2 × $10^{8}$ | 1.6 × $10^{7}$ | 1.1 × $10^{12}$ | 1.8 × $10^{10}$ | 4.3 × $10^{8}$ | 7.8 × $10^{6}$ |
| Conductivity (S/m) | 1.4 × $10^{-11}$ | 8 × $10^{-7}$ | 6.1 × $10^{-6}$ | 9.4 × $10^{-11}$ | 5.6 × $10^{-9}$ | 2.3 × $10^{-7}$ | 1.3 × $10^{-5}$ |
| Compression Set Property when held in compression at 200° C. for 70 hours ||||||||
| Average of 3 tests | 18.5 | 15.8 | 20.2 | 19.4 | 15.8 | 19.2 | Not Tested |
| 1 | 17.4 | 15.5 | 19.5 | 19.7 | 15.8 | 19.0 | |
| 2 | 19.0 | 16.2 | 20.5 | 18.9 | 15.3 | 19.3 | |
| 3 | 19.0 | 15.8 | 20.7 | 19.6 | 16.3 | 19.4 | |

TABLE 8

| Testing | | CE8 | E8A | E8B |
|---|---|---|---|---|
| Mooney Viscosity (MU) | | 101.7 | 73.7 | 52.1 |
| MDR 177° C. × 12 min. | ML (dNm) | 4.1 | 3.2 | 2.4 |
| | MH (dNm) | 32.1 | 32.1 | 28.2 |
| | Tan Delta MH | 0.036 | 0.034 | 0.03 |
| | Ts2 (min.) | 1.7 | 0.7 | 0.5 |
| | T50 (min.) | 2.6 | 0.9 | 0.6 |
| | T90(min.) | 3.4 | 1.2 | 0.8 |
| Cure Conditions: Press Cure Cured at 170° C. for 15 min ||||| 
| Post Cure Cured at 200° C. for 8 hours |||||
| Physical Property | HS | 74 | 77 | 74 |
| | Tb[MPa] | 17 | 13.2 | 10.4 |
| | Eb[%] | 185 | 144 | 126 |
| | Modulus [MPa] | 8.1 | 9.3 | 8.4 |
| Resistivity (ohm-cm) | | 9.9 × $10^{12}$ | 2.1 × $10^{9}$ | 1 × $10^{9}$ |
| Conductivity (S/m) | | 1 × $10^{-11}$ | 4.7 × $10^{-8}$ | 9.7 × $10^{-8}$ |
| Glass transition temperature (° C.) | | 6.3 | 6.3 | 6.3 |
| Compression Set Property when held in compression |||||
| at 200° C. for 70 hours |||||
| Press Cure Cured at 170° C. for 15 min |||||
| Post Cure Cured at 200° C. for 8 hours |||||
| Average of 3 tests | | 15.4 | 17.9 | 17.5 |
| 1 | | 15.5 | 17.9 | 17.7 |
| 2 | | 15.4 | 17.7 | 17.7 |
| 3 | | 15.4 | 17.9 | 17.2 |

Examples 9-14

The solubility of the curative in the ionic liquid was investigated. A curative and an ionic liquid as described below were placed in a glass jar. The glass jar was then placed on a roller (2.4 rpm) for one hour at 23° C., unless otherwise indicated. The glass jar was removed and the contents were visually inspected. Shown below are the amounts of curative and ionic liquid used and the results of the visual inspection.

Example 9

A 1% solution was made with 0.1 grams of bisphenol AF (solid) was added to 9.9 grams of IL#1 in a glass jar. The resulting solution was clear and colorless.

Example 10

A 10% solution was made with 1.0 grams of bisphenol AF (solid) was added to 9.0 grams of IL#1 in a glass jar. The resulting solution was clear and colorless.

Example 11

A 20% solution was made with 2.0 grams of bisphenol AF (solid) was added to 8.0 grams of IL#1 in a glass jar. After 16 hrs at 40° C. on the roller, the resulting solution was clear and colorless.

Example 12

A 1% solution was made with 0.1 grams of benzyltriphenyl phosphonium chloride (solid) was added to 9.9 grams of IL#1 in a glass jar. After 16 hrs at 40° C. on the roller, the resulting solution was clear and colorless.

Example 13

A 10% solution was made with 1.0 grams of benzyltriphenyl phosphonium chloride (solid) was added to 9.0 grams of IL#1 in a glass jar. The resulting solution was white and cloudy indicating that the curative was not completely dissolved.

Example 14

A 1% solution was made with 0.1 grams of the Cure 2 in IL#1 in a glass jar. After 16 hrs at 40° C. on the roller, the resulting solution was clear and colorless.

Example 15

A 1% solution was made with 0.1 grams of a 1:1 complex of triphenylbenzylphosphonium with bisphenol AF (solid) in IL#1 in a glass jar. After 16 hrs at 40° C. on the roller, the resulting solution was colorless and hazy, indicating that the curative was almost completely dissolved.

Example 16 (E16), Example 17 (E17) and Comparative Example (CE7)

Compounds were made as Example 1A. The amounts of materials used in preparing the fluoroelastomer gums of the Examples and Comparative Examples are shown below in Table 9, wherein the amounts are given in parts by weight. The compounded fluoroelastomer gum samples above were then tested for cure properties following the "MDR" Method described above. The results are shown in Table 10 below.

TABLE 9

| Material | E16 | E17 | CE7 |
|---|---|---|---|
| F8 | 100 | 100 | 100 |
| IL#1 | 1.0 | 2.0 | 0 |

TABLE 9-continued

| Material | E16 | E17 | CE7 |
|---|---|---|---|
| Carbon | 30 | 30 | 30 |
| MgO | 10 | 10 | 10 |

TABLE 10

| Testing | | E16 | E17 | CE7 |
|---|---|---|---|---|
| Mooney Viscosity (MU) | | | 23 | |
| MDR 177° C. × 60 min. | ML (dNm) | 0.8 | 0.7 | 0.6 |
| | MH (dNm) | 19.9 | 22.3 | 22.0 |
| | Tan Delta ML | 1.3 | 1.3 | 1.4 |
| | Tan Delta MH | 0.076 | 0.066 | 0.057 |
| | Ts2 (min.) | 6.0 | 5.0 | 4.8 |
| | T50 (min.) | 10.0 | 9.2 | 8.5 |
| | T90 (min.) | 20.3 | 18.4 | 18.0 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising:
   (i) a partially fluorinated elastomer gum comprising a partially fluorinated polymer; and
   (ii) less than 10 wt % of an ionic liquid based on the total weight of the partially fluorinated polymer and the ionic liquid, wherein partially fluorinated polymer has a first glass transition temperature and the addition of the ionic liquid to the partially fluorinated polymer has a second glass transition temperature and the second glass transition temperature is less than 2° C. different from the first glass transition temperature.

2. The composition according to claim 1, wherein the amount of the ionic liquid is greater than 0.01 wt % and less than 1.0 wt % based on the total weight of the ionic liquid and the partially fluorinated polymer.

3. The composition according to claim 1, wherein the amount of the ionic liquid is greater than 1.0 wt % and less than 10.0 wt % based on the total weight of the ionic liquid and the partially fluorinated polymer.

4. The composition according to claim 1, wherein the ionic liquid has a melting point of about 100° C. or less.

5. The composition according to claim 1, wherein the partially fluorinated polymer is a copolymer.

6. The composition according to claim 1 with the proviso that the partially fluorinated polymer is not a vinylidene fluoride/hexafluoropropylene copolymer.

7. The composition according to claim 1, wherein the anion of the ionic liquid comprises a perfluoroalkyl group.

8. The composition according to claim 1, further comprising an organic filler selected from at least one of a polytetrafluoroethylene powder and a TFE/perfluorovinyl ether copolymer powder.

9. The composition according to claim 1, wherein the composition is non-conductive.

10. The composition according to claim 1, wherein the partially fluorinated elastomer gum is peroxide curable.

11. The composition according to claim 1, wherein the partially fluorinated elastomer gum is bisphenol or amine curable.

12. The composition according to claim 1, further comprising a cure system.

13. The composition according to claim 1, wherein the ionic liquid comprises a cation and an anion and the anion is a bis(trifluoromethylsulfonyl) imide.

14. An article comprising the composition according to claim 1.

15. A cured article comprising the composition according to claim 1.

16. The cured article according to claim 15, wherein the cured article is a hose, a gasket, or a seal.

17. A composition comprising:
   (i) a cured partially fluorinated elastomer comprising a partially fluorinated polymer; and
   (ii) less than 10 wt % of an ionic liquid based on the total weight of the partially fluorinated polymer and the ionic liquid, wherein partially fluorinated polymer has a first glass transition temperature and the addition of the ionic liquid to the partially fluorinated polymer has a second glass transition temperature and the second glass transition temperature is less than 2° C. different from the first glass transition temperature.

18. A method comprising blending (i) partially fluorinated elastomer gum comprising a partially fluorinated polymer and (ii) less than 10 wt % of an ionic liquid based on the total weight of the partially fluorinated polymer and the ionic liquid, wherein partially fluorinated polymer has a first glass transition temperature and the addition of the ionic liquid to the partially fluorinated polymer has a second glass transition temperature and the second glass transition temperature is less than 2° C. different from the first glass transition temperature.

* * * * *